US006816847B1

(12) United States Patent
Toyama (10) Patent No.: US 6,816,847 B1
(45) Date of Patent: Nov. 9, 2004

(54) COMPUTERIZED AESTHETIC JUDGMENT OF IMAGES

(75) Inventor: Kentaro Toyama, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/404,940

(22) Filed: Sep. 23, 1999

(51) Int. Cl.[7] ............................. G06F 15/18; G06K 9/62
(52) U.S. Cl. ............................. 706/14; 706/18; 706/20; 382/156; 382/157; 382/158; 382/159; 382/224
(58) Field of Search ............................. 706/14, 20, 18; 382/157, 158, 159, 156, 224, 128, 133, 155, 185

(56) References Cited

U.S. PATENT DOCUMENTS

| | | | | | |
|---|---|---|---|---|---|
| 5,465,321 | A | * | 11/1995 | Smyth | 706/20 |
| 5,559,929 | A | * | 9/1996 | Wasserman | 706/25 |
| 5,561,741 | A | * | 10/1996 | Wasserman | 706/25 |
| 5,659,666 | A | * | 8/1997 | Thaler | 706/16 |
| 5,761,383 | A | * | 6/1998 | Engel et al. | 706/14 |
| 6,018,727 | A | * | 1/2000 | Thaler | 706/16 |
| 6,081,612 | A | * | 6/2000 | Gutkowicz-Krusin et al. | 382/128 |
| 6,092,059 | A | * | 7/2000 | Straforini et al. | 706/14 |
| 6,112,195 | A | * | 8/2000 | Burges | 706/20 |
| 6,161,130 | A | * | 12/2000 | Horvitz et al. | 709/206 |
| 6,182,058 | B1 | * | 1/2001 | Kohavi | 706/45 |
| 6,192,360 | B1 | * | 2/2001 | Dumais et al. | 707/6 |
| 6,278,799 | B1 | * | 8/2001 | Hoffman | 382/159 |
| 6,293,904 | B1 | * | 9/2001 | Blazey et al. | 600/26 |
| 6,306,077 | B1 | * | 10/2001 | Prabhu et al. | 600/26 |
| 6,327,581 | B1 | * | 12/2001 | Platt | 706/12 |
| 6,356,884 | B1 | * | 3/2002 | Thaler | 706/16 |

OTHER PUBLICATIONS

Machado et al., "Computing Aesthetics", Lecture Notes in Computer Science, 1998, retrieved from the Internt, http://citeseer.ist.psu.edu/336758.html.*
Oh et al., "Image Thresholding by Indicator Kriging, IEEE Transactions on Pattern Analysis and Machine Intelligence", 1998.*
Reich, Y., "A Model of Aesthetidc Judgement", A Model of Aesthetic Judgement in Design in Engineering, 1993, vol. 8, Iss 2, pp. 141–153.*
Yasuda et al., "Application of Neural Network to Aesthetic Design of Bridges", Proceedings of the 2nd International Symposium on Uncertainty Modeling and Analysis, Apr. 1993, pp. 534–541.*
Laaksonen et al., "PicSOM: Self–Organizing Maps for Content–Based Image Retrieval", International Joint Conference on Neur Networks, vol 4, Jul. 1999, pp. 2470–2473.*
Parisi et al., "Car Plate Recognition by Neural Networks and Image Processing", Proceedings of the IEEE International Symposium on Circuits and Systems, vol. 3, May 1998, pp. 195–198.*

(List continued on next page.)

*Primary Examiner*—Anthony Knight
*Assistant Examiner*—Kelvin Booker
(74) *Attorney, Agent, or Firm*—Lyon & Harr, L.L.P.; Craig S. Fischer (57) ABSTRACT

Computerized aesthetic judgment of images is disclosed. In one embodiment, a computer-implemented method inputs a training set of images, where each image has a corresponding set of aesthetic scores. The method trains a classifier based on the training set, and outputs the classifier. An image can then be input into the classifier, such that an aesthetic score for the image is generated by the classifier and output. Furthermore, recommendations can be generated to improve the aesthetic score for the image, which are also output.

28 Claims, 4 Drawing Sheets

OTHER PUBLICATIONS

Wong et al., "A Two–Level Model–based Object Recognition Technique", 1994 International Symposium on Speech, Image Processing and Neural Networks, Apr. 1994, vol. 1, pp. 319–322.*

Alwis et al., "Searching Image Databases Containing Trademarks", IEE Colloquium on Neural Networks in Interactive Multimedia Systems, Oct. 1998, pp. 2/1–2/5.*

Machado et al., "Generation and Evaluation of Artworks", 1997, Retrieved from the Internet: http://www.cs.tu–berlin.de/~mki/EuroCog/ papers/Machado/machado_Ok.ps.*

Machado et al., "Model Proposal for a Constructed Artist", Proceedings of the 1st World Multiconference on Systemics, Cybernetics and Informatics, SCI'97/ISAS'97, vol. 2, pp. 521–528, Jul. 1997.*

Machado et al., "Computing Aesthetics", Proceedings of the 24th Brazillian Symposium on Artifical Intelligence, SBIA'98, LNAI Series, pp. 219–229, Nov. 1998.*

Cromp et al., "Data Mining of Multidemsional Remotely Sensed Images", Proceedings of the 2nd International Conference on Information and Knowledge Management, pp. 471–481, 1993.*

Perlovsky, L.I., "Emotions, Learning and Control", Proceedings of the 1999 IEEE International Symposium on Intelligent Control/Intelligent Systems and Semiotics, pp. 132–137, Sep. 1999.*

Watanabe et al., "Analysis and Visualization of Properties of Free–Form Surfaces", Proceedings of the 1998 IEEE Conference on Information Visualization, pp. 174–177, Jul. 1998.*

Purchase, H.C., "The Effects of Graph Layout", Proceedings of the 1998 Australasian Computer Human Interaction Conferenc pp. 80–86, Nov. 1998.*

Koch et al., "Coactive Aesthetics and Control Theory", Proceedings of the 5th IEEE International Symposium on Intelligent Control, vol. 1, pp. 93–97, Sep. 1990.*

Toyama, K., "Head Parallax Tracking for Control of a Virtual Space: A Comparison of Algorithms", 1999 IEEE International Conference on Systems, Man, and Cybernetics, vol. 6, pp. 1–6, Oct. 1999.*

Jagielski, R., An Application of Neural Networks to Emulation of Aesthetic Judgements, Proceedings of the 1st New Zealand International Two–Stream Conference on ANN and Expert–Systems, Nov. 1993, pp. 334–337.*

Yasuda et al., Aesthetic Design System of Structures Using Neural Network and Image Database, Proceedings of the ISUMA–NAFIPS, Sep. 1995, pp. 115–120.*

Sundarasaradula et al., Using Neural Networks For Undithering, Proceedings of the IEEE International Conference on Neural Networks, Nov. 1995, vol. 4, pp. 1892–1897.*

Poli et al., Evolution of Pseudo–Colouring Algorithms for Image Enhancement with Interactive Genetic Programming, Jan. 1997, Technical Report: CSRP–97–5, School of Computer Science, The University of Birmingham, NEC Research Index.*

Pickover, C.A., Pattern Formation and Chaos in Networks, Communications of the ACM, Feb. 1988, vol. 31, No. 2, pp. 136–151.*

Chen et al., From Latent Semantics to Spatial Hypertext–AnIntegrated Approach, Conference on Hypertext and Hypermedia, 1998, pp. 77–86.*

Cromp et al.; "Data Mining of Multidimensional Remotely Sensed Images". ACM[online], Proceedings of the 1993 CIKM, Nov. 1993, pp. 471–480.*

Besl et al.; "Three–Dimensional Object Recognition". Computing Surveys, Mar. 1985, vol. 17, No. 1, pp. 75–132.*

Egbert et al.; "Generalization Capabilities of Subtle Image Pattern Classifiers". IEEE Transactions on Knowledge and Data Engineering, Apr. 1992, vol. 4, No. 2, pp. 172–177.*

Burzzone et al.; "An Incremental Learning Classifier for Remote–Sensing Images". IEEE 1999 International Geoscience and Remote Sensing Symposium, Jun. 1999, vol. 5, pp. 2483–2485.*

Toyama et al.; "Incremental Focus of Attnetion for Robust Visual Tracking". IEEE Computer Science Conference on Computer Vision and Parrern Recognition, Jun. 1996, pp. 189–195.*

Toyama et al.; "Keeping Your Eye on the Ball: Tracking Occluding Contours of Unfamiliar Objects without Distraction". 1995 IEEE/RSJ International Conference on Intelligent Robots and Systems, Aug. 1995, vol. 1, pp. 354–359.*

J. Platt, Fast Training of Support Vector Machines using Sequential Minimal Optimization, MIT Press, Balitimomre, MD, Jan. 1, 1998.

M. Sahami, S. Dumais, D. Heckerman, E. Horvitz, A Bayesian Approach to Junk E–Mail Filtering, AAAI Wkshp on Text Class'n, Madison, WI, TR WS–98–05, Jul. 1, 1998.

J. Burstein, K. Kukich et al., Enriching Automated Scoring Using Discourse Marking, Proc. Workshop Discourse Relations & Marking, Aug. 1, 1998.

J. Burstein, K. Kukich, et al., Computer Analysis of Essays, NCME Symposium on Automated Scoring, Apr. 1, 1998.

A. Belegundu, T. Chandrupatla, Organization Concepts and Applications in Engineering, Prentice Hall, ISBN 0130312797, Dec. 1, 1998. Abstract.

A. O'Toole, T. Vetter, et al., Three–dimensional caricatures of human heads, Perception, 26 , pp. 719–732, Mar. 16, 1997.

J. Burstein, M. Chodorow, Automated Essay Scoring of Nonnative English Speakers, Joint Symposium of ACL & IALLT, Workshop, Jun. 1, 1999.

A. O'Toole, H. Abdi, et al., Low–dimensional representation of faces in higher dimensions of the face sapce, J. Opt. Soc. Am. A., vol. 10, No. 3, pp. 405–411, Mar. 1, 1993.

A. O'Toole, S. Edelman, Face distinctiveness in recognition across viewpoint, Proc. Int'l Workshop on Automatic Face & Gesture Recog., Jan. 1, 1996.

J. Burstein, K. Kukich et al., Automated Scoring Using a Hybrid Feature Identification Technique, Proc. Annual Mtg. Assn. Computational Linguistics, Montreal, Aug. 1, 1998.

J. Burstein, R. Kaplan, et al., Using Lexical Semantic Techniques to Classify Free–Responses, Proc. SIGLEX 1996 Workshop, Annual Mtg. of Assn. of Computational Linguistics, Jan. 1, 1996.

D. Michael Burt, David I. Perrett, Perception of Age in Adult Male Caucasian Faces, Proc. R. Soc. Lond. B (1995) 259, 137–143, Jan. 1, 1995.

D. Rowland, D. Perrett, Manipulating Facial Appearance through Shape and Color, IEEE Computer Graphics and Applications, vol. 15, No. 5, pp., Sep. 1, 1995.

D. Rowland, D. Perrett, D. Burt, K. Lee, S. Akamatsu, Transforming Facial Images in 2 and 3–D, Imagina 97–Conferneces–Actes/Proceedings, Monte–Carlo, Feb. 1, 1997.

Facial Aging, Attractiveness, and Distinctiveness, K. A. Deffenbacher, T. Vetter, J. Johanson, and A. O'Toole, Perception, vol. 27, pp. 1233–1243 (1998).

* cited by examiner

COMPUTERIZED AESTHETIC JUDGMENT OF IMAGES

FIELD OF THE INVENTION

This invention relates generally to images, and more particularly to the aesthetic judgment of images.

BACKGROUND OF THE INVENTION

Graphics applications have become increasingly popular for computers, even for non-professional users. Graphics applications allow users to design their own images, for distribution, for example, to friends, family and co-workers. In addition, the increasing popularity of the Internet has meant that end users have even more distribution options for their work, such as posting images on web sites. The web site design process itself can be referred to as an image design process. As used herein, the term image is general, and encompasses any graphics-related work, such as web pages, created pictures, scanned-in pictures or pictures taken by digital camera, drawings, technical drawings, page layout for desktop publishing and work processing, etc. In short, the term image is inclusive of any element that includes something besides just straight text, and thus includes organization of text, which can be deemed a graphical organization of the text, etc.

A shortcoming of current graphics applications for computers, however, is that they cannot judge the end result of a user's creation. Many graphics applications, such as Visio, Microsoft® Picture-It®, and Microsoft® FrontPage®, provide wizards and templates to make the creation of images easier, and make the end result more professional looking. However, because the user is still given considerable discretion in the designing of the images, even when using wizards and templates, the user may unknowingly create something that looks unprofessional, or even garish-looking. Besides asking family, friends and co-workers for their opinions—who themselves are likely to be non-professionals—the user has few options for determining how aesthetic his or her image is.

For this and other reasons, then, there is a need for the present invention.

SUMMARY OF THE INVENTION

The invention relates to computerized aesthetic judgment of images. In one embodiment, a computer-implemented method inputs a training set of images, where each image has a corresponding set of one or more aesthetic scores. The method trains a classifier based on the training set, and outputs the classifier. An image can then be input into the classifier, such that an aesthetic score for the image is generated by the classifier and output. Furthermore, recommendations can be generated to improve the aesthetic score for the image, which are also output.

Thus, a number of sample images are surveyed by professional designers and graphic artists, among other professionals, where each image receives an aesthetic score from each professional, to make up the training set. This training set is then input into a classifier, such as a Bayesian classifier or a Support Vector Machine (SVM), which correlates the scores for the images based on features of the images, such as the presence and distribution of colors, etc. The resulting trained classifier can then be used by end users, to provide aesthetic scores for their own images. Recommendations to improve the aesthetic scores of the images, and thus the aesthetics of the images, can also be generated, based on the same features selected by the classifier, utilizing a gradient ascent or localized search approach, for example.

In this manner, embodiments of the invention provide for advantages not found within the prior art. Integrating an embodiment of the invention into graphics programs, or integrating an embodiment into a stand-alone program, allows end users to have access to professional judgment as to how "good" their created images "look." The end users can make changes as necessary based on the resulting aesthetic scores of their images, to improve the images' scores, or rely on the recommendations made by an embodiment of the invention to improve the images' scores.

Embodiments of the invention include computer-implemented methods, computer-readable media, computers and computerized systems of varying scope. Still other embodiments, advantages and aspects of the invention will become apparent by reading the following detailed description, and by reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
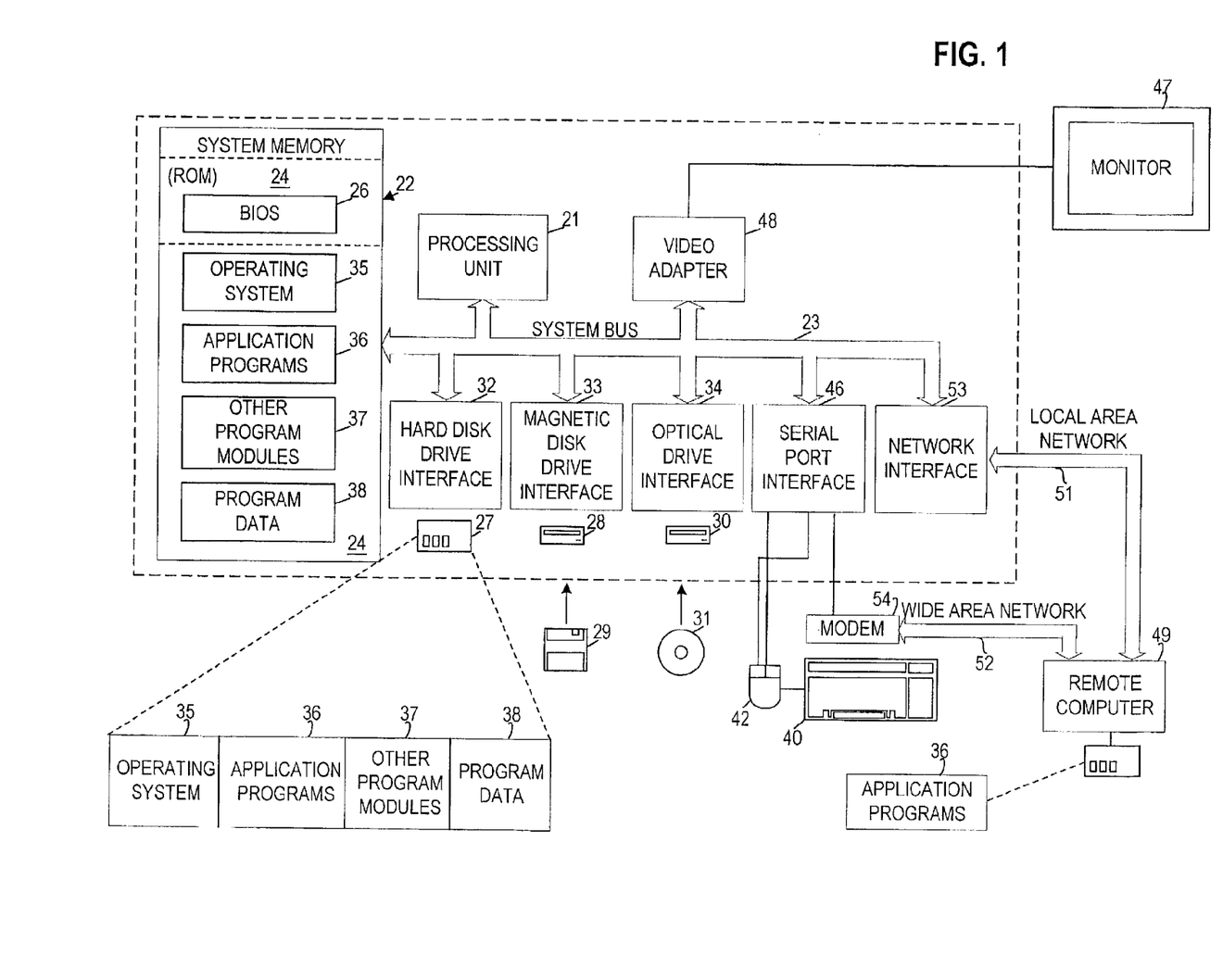
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed-computing-environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Methods

As described in subsequent sections of the detailed description, embodiments of the invention are described as methods, which can be computer-implemented methods. The methods may be performed, for example, by a computerized system. The computer-implemented methods can be realized at least in part as one or more programs running on a computer—that is, as a program executed from a computer-readable medium such as a memory by a processor of a computer, such as the computer described in the preceding section of the detailed description. The programs are desirably storable on a machine-readable medium such as a floppy disk or a CD-ROM, for distribution, installation and execution on another computer.

Training

Figure 2:
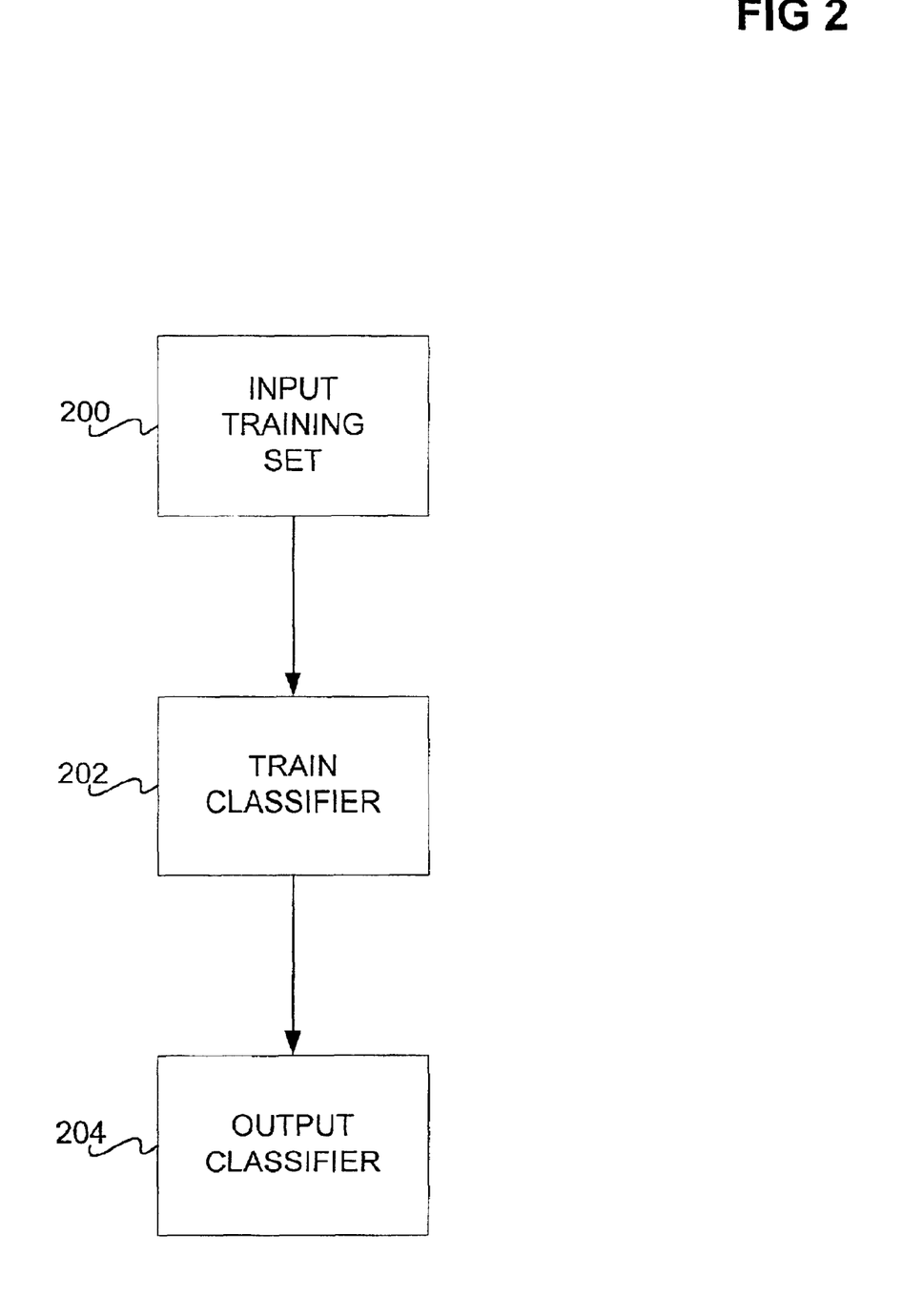
FIG. 2 is a flowchart of a method for training a classifier according to an embodiment of the invention.

In this section of the detailed description, a method for training a classifier, according to one embodiment of the invention, is described. Referring to FIG. 2, a flowchart of the method is shown. In 200, a training set of images and corresponding aesthetic scores for the images is input. The images are desirably the same type of images that are to be later judged. For example, the images may include a set of web pages, a set of scanned-in pictures, a set of created pictures, a set of drawings, a set of page layouts, etc. The aesthetic scores for the images are desirably made by graphics professionals. Thus, the web pages are desirably scored by professional web page designers, the scanned-in pictures by professional photographers, the created pictures by professional artists, the drawings by professional drawers, etc.

The set of images in the training set desirably includes a wide variety of images, both those considered aesthetically pleasing, and those considered aesthetically poor. Likewise, the aesthetic scores for each image desirably includes a number of such scores, by a diverse number of professionals or laypeople, groups of which may be intentionally selected for their common taste (e.g., people who prefer The New York Times to the Wall Street Journal, people who read Wired Magazine, etc.). Each image is desirably scored manually by each professional (or each person surveyed) by whatever criteria the person wishes to use for deeming the aesthetics of the image, or according to some standard specified by the survey. Each image may, for example, be scored on a number basis, such as from zero to one-hundred, or, for example, on a classification basis, where there are a number of categories, such as "excellent," "good," "average," "poor," etc.

In 202, the input training set is used to training a classifier. A classifier is a scheme or an algorithm that is used to discern or correlate common aspects of that which is being judged with the judgment given. In the context of embodiments of the invention, the aspects that the classifier can use may include such image features as: the presence and distribution of various colors; the various geometrical quantities and qualities of segmented parts of an image, such as position, orientation, moments, etc.; coefficients of various transformations of image regions, such as Fourier analysis, Discrete Cosine Transform (DCT), wavelet analysis, etc.; and, higher-level representations of the image. These features are represented numerically as a "feature vector," which can be thought of as a series of numeric values that represent the image with respect to its image features. The invention is not limited to a particular number or a particular type of image features used by the classifier to discern commonality (that is, detect correlation) among like-judged images and their corresponding aesthetic scores.

In one embodiment, the classification methodology may employ different phases of analysis, including feature selection, classifier construction, and mapping classifier outputs to measures of beliefs that an image is a member of a given classificatory class, or has received a given aesthetic score. In one embodiment, the classification methodology is based on a Bayesian learning approach, also referred to as a Bayesian classifier, as described in the reference M. Sahami, S. Dumais, D. Heckerman, E. Horvitz, *A Bayesian Approach to Junk E-Mail Filtering*, AAAI Workshop on Text Classification, July 1998, Madison, Wis., AAAI Technical Report WS-98-05. In other embodiments, the classification methodology is based on a linear Support Vector machine methodology, as described in the reference J. Platt, *Fast Training of Support Vector Machines using Sequential Minimal Optimization*, MIT Press, Baltimore, Md., 1998. Other classification methodologies that can be used by embodiments of the invention include artificial neural nets and decision trees. The invention is not limited to a particular classification technology.

For example, Support Vector Machines build classifiers by identifying a hyperplane that separates a set of positive and negative examples with a maximum margin. In the linear form of SVM that is employed in one embodiment, the margin is defined by the distance of the hyperplane to the nearest positive and negative cases for each class. Maximizing the margin can be express as an optimization problem and search and optimization thus lay at the core of different SVM-based training methods. A post-processing procedure described in the Platt reference is used that employs regularized maximum likelihood fitting to produce estimations of posterior probabilities. The method fits a sigmoid to the score that is output by the SVM classifier.

A set of aesthetic classes is created in one embodiment (as opposed to the embodiment, for example, where each image receives a score on a predetermined scale), and classes are assessed for each image by the survey of graphics professionals. Thus, a training set for analysis by the SVM is built by the classifier-construction procedure by manually partitioning the images into the different classes. Given a training corpus, the classification methods first apply feature-selection procedures that attempt to find the most discriminatory features. This process employs a mutual-information analysis. Feature selection can operate on single image features, as well as higher-level distinctions made available to it. The quality of the learned classifiers for aesthetic image judgment can be enhanced by inputting to the feature selection procedures handcrafted features that are identified as being useful for distinguishing among images of different aesthetics. Thus, during feature selection, image features that are useful for discriminating among images of different aesthetics can be considered.

Finally, in 204, the classifier is output. The invention is not particularly limited to the manner by which the classifier is output. The classifier, for example, can be integrated into an already existing graphics program, such that the classifier is invoked by selecting a command within the program to do so. In another embodiment, the classifier is inserted into a stand-alone program, which can input images of various file formats for analysis.

Generating an Aesthetic Score for an Image

Figure 3:
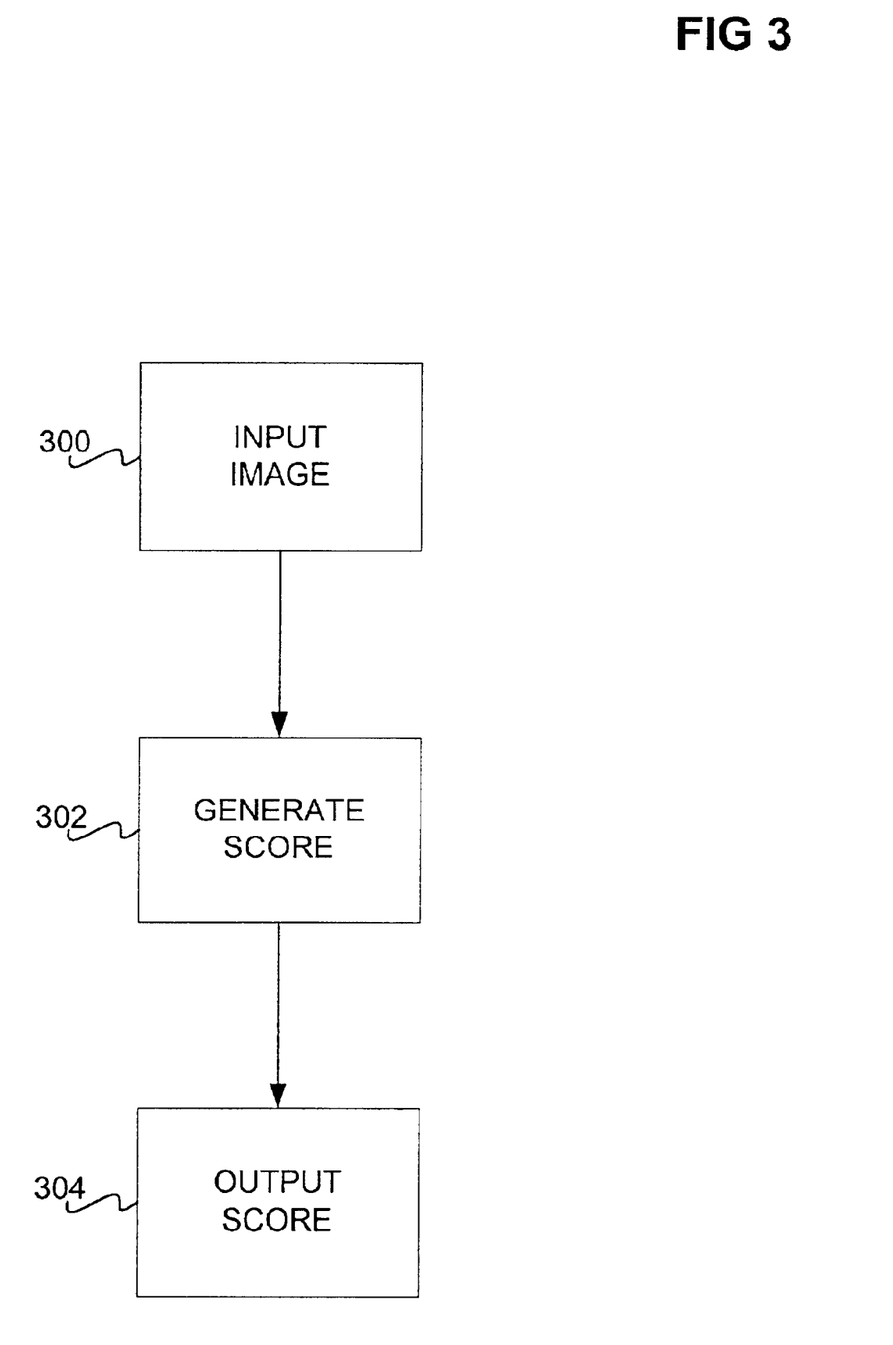
FIG. 3 is a flowchart of a method for generating an aesthetic score for an image according to an embodiment of the invention; and, FIG. 4 is a flowchart of a method for generating recommendations as to how to improve the aesthetic score for an image according to an embodiment of the invention.

In This Section of the Detailed Description, a Method for Generating an Aesthetic score for an image, according to one embodiment of the invention, is described. Referring to FIG. 3, a flowchart of the method is shown. In 300, an image is input. As described in the background section, the term image is general, and thus the image can be a scanned-in picture, a web-page layout, a desktop-publishing or word-processing layout, a drawing, etc. The invention is not so limited. However, desirably, the type of image input is consistent with the type of images used as the training set in the training phase of the classifier. For example, a web-page layout is best aesthetically scored when input into a classifier that has been previously trained on a variety of web-page layouts.

Thus, in 302, the classifier is used to generate an aesthetic score for the image. That is, the classifier as previously trained with a training set is used. The classifier uses the same feature selection it applied against the set of training images to determine the aesthetic score for the image, consistent with the methodology or scheme of the particular classifier used (e.g., a Bayesian classifier, an SVM, etc.). The classifier thus generates a numerical value of the image, or probabilities that the image falls into one or more aesthetical classes, or just the aesthetical class into which the image has the highest probability of being located—all of these are considered the "aesthetic score" of the image, as used herein.

In 304, the aesthetic score is then output. For example, a window may be displayed on the screen, indicating to the user the score generated by the classifier for the image. However, the invention is not limited to a particular manner by which the aesthetic score is output.

Recommending Improvements

Figure 4:
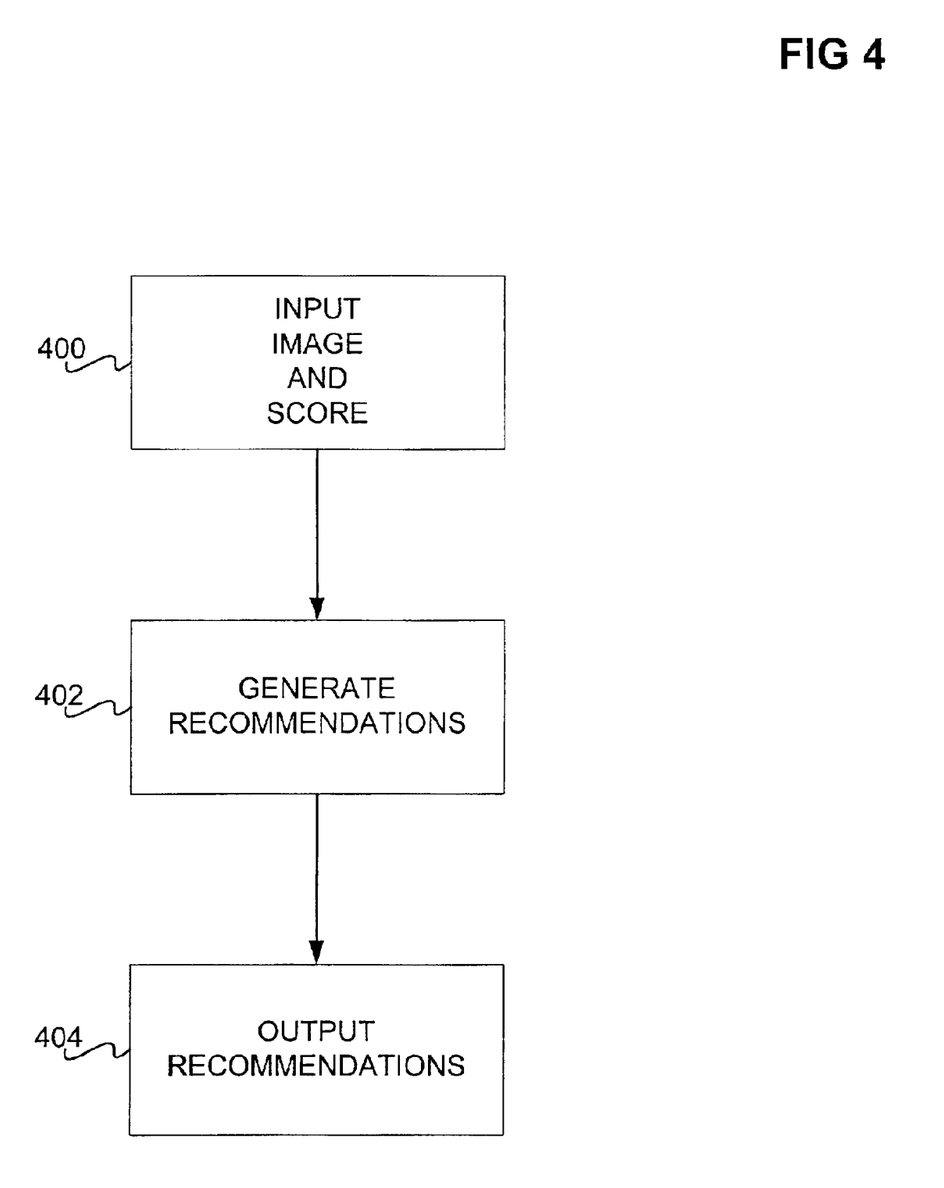

In this section of the detailed description, a method for recommending improvements to the image so as to improve its aesthetic score, according to one embodiment of the invention, is described. Referring to FIG. 4, a flowchart of the method is shown. In 400, an image and optionally its associated aesthetic score, as generated by the classifier, are input.

In 402, the classifier, previously trained with a training set as has been described, and previously used to generate the aesthetic score for the image in question, is utilized to generate recommendations as to how to improve the aesthetic score for the image. The recommendations are suggestions as to how the image's score could be improved by manipulating visual elements in the image. For example, the recommendations may suggest that particular colors be used, or that certain geometrical elements be removed, in order to improve the image's aesthetic score. In its most general form, these recommendations come by some optimization strategy, of which there are many types familiar to those skilled in the art.

In one embodiment of the invention, a gradient ascent, as known within the art, is used to generate these recommendations. The gradient ascent is applied against the feature-vector space of the image, where "feature vectors" are as defined earlier. A classifier as described in the previous section effectively maps feature vectors in the feature vector space to single numeric scores. Gradient ascent proceeds by varying individual or sets of values in a feature vector by small amounts in an attempt to find a local region of the feature-vector space that results in a higher score than the image originally classified. Thus applied, the gradient ascent ascends locally to one or more points in the feature-vector space that maximize the aesthetic score that is given to the image. That is, the gradient ascent determines which aspects of the image are causing the image's aesthetic score to not be maximized, such that the user can change those aspects in order to improve the score.

In another embodiment of the invention, a local search is performed, as known within the art, to generate the recommendations. For example, feature vector values within a predetermined range are modified to determine the value that maximizes the aesthetic score for the image. In addition, a gradient ascent with multiple restarts in areas of the feature-vector space that are farther out can be used to generate the recommendations. In the case of multiple restarts, the adjustment made to the original feature vector for each "restart" may be fairly large, allowing the technique to search in a greater region of the feature-vector space than allowed by the local search or gradient ascent techniques alone. In general, embodiments of the invention are inclusive of any manner by which optima can be determined for features used by the classifier to generate the aesthetic score for an image.

Furthermore, recommendations can be made according to other optimization strategies, in other embodiments of the invention. Optimization strategies are generally described in the reference Ashok D. Belegundu, Tirupathi R. Chandrupatla, Optimization Concepts and Applications in Engineering, Prentice Hall, December 1998 (ISBN 0130312797).

In 404, the recommendations are output to the user. The invention is not limited to the manner by which such output occurs. In one embodiment, the application program of which the recommendation generator is a part, or is the stand-alone aspect of the program, simply displays a list to the user of the recommendations, leaving it to the user to make the suggested improvements. In another embodiment, a suggested improvement can be actually made to the image, such that the user is able to click an "OK" button to accept the change made, or a "Reject" button to reject the change made. In this embodiment, if there is more than one improvement, all of the improvements can be made at the same time to the image, or the user can have the option of cycling through the improvements to determine which ones he or she wishes to accept, and which ones he or she wishes to reject.

CONCLUSION

Computerized aesthetic judgment of images has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof

I claim:

1. A computer-implemented method comprising:

inputting a training set including a plurality of images and a corresponding plurality of aesthetic scores for the images;

training a classifier to provide aesthetic scores based on the training set;

generating an aesthetic score for an image based on the classifier, and generating a recommendation that suggests how to improve the aesthetic score for the image by manipulating visual elements of the image.

2. The method of claim 1, wherein generating a recommendation comprises utilizing a gradient ascent.

3. The method of claim 1, wherein generating a recommendation comprises performing a local search.

4. The method of claim 1, wherein training a classifier comprises training one of a Bayesian classifier, a Support Vector Machine (SVM) classifier, a neural net classifier, and a decision tree classifier.

5. The method of claim 1, wherein training a classifier comprises utilizing feature selection to correlate at least one image feature of the images with their corresponding aesthetic scores.

6. The method of claim 5, wherein utilizing feature selection to correlate at least one image feature comprises utilizing feature selection to correlate at least one image feature selected from the group essentially consisting of: color presence, color distribution, geometrical quantities of segmented image parts, coefficients of image transformations, and higher-level image representations.

7. A computer-implemented method comprising:
inputting an image;
generating an aesthetic score for the image by utilizing a classifier previously trained on a training set including a plurality of images and a corresponding plurality of aesthetic scores for the images; and,
generating a recommendation to improve the aesthetic score.

8. The method of claim 7, wherein generating an aesthetic score comprises generating an aesthetic score based on at least one image feature of the image.

9. The method of claim 8, wherein generating an aesthetic score based on at least one image feature of the image comprises generating an aesthetic score based on at least one image feature selected form the group essentially consisting of: color presence, color distribution, geometrical quantifies of segmented image parts, coefficients of image transformations, and higher-level image representations.

10. The method claim 7, wherein utilizing a classifier comprises utilizing one of a Bayesian classifier, a Support Vector Machine (SVM classifier, a neural net classifier, and a decision tee classifier.

11. A computer-implemented method comprising:
inputting an image and a corresponding aesthetic score for the image previously generated by utilizing a classifier previously trained on a training set including a plurality of images and a corresponding plurality of aesthetic scores for the images;
generating a recommendation to improve the aesthetic score for the image; and,
outputting the recommendation.

12. The method of claim 11, wherein generating a recommendation comprises utilizing a gradient ascent.

13. The method of claim 11, wherein generating a recommendation comprises performing a local search.

14. The method of claim 11, wherein inputting an image and a corresponding aesthetic score comprises inputting an image and a corresponding aesthetic score for the image previously generated based on at least one image feature of the image.

15. The method of claim 14, wherein inputting an image and a corresponding aesthetic score for the image previously generated based on at least one image feature of the image comprises inputting an image and a corresponding aesthetic score for the image previously generated based on at least one image feature of the image selected from the group essentially consisting of: color presence, color distribution, geometrical quantifies of segmented image parts, coefficients of image transformations, and higher-level image representations.

16. The method of claim 11, wherein inputting an image and a corresponding aesthetic score comprises inputting an image and a corresponding aesthetic score for the image previously generated by utilizing one of a Bayesian classifier, a Support Vector Machine (SVM) classifier, a neural net classifier, and a decision tree classifier.

17. A machine-readable medium having instructions stored thereon for execution by a processor to perform a method comprising:
inputting a training set including a plurality of images and a corresponding plurality of aesthetic scores for the images;
training a classifier to provide aesthetic scores based on the training set;
inputting an image and utilizing the classifier to generate a corresponding aesthetic score for the image; and
generating a recommendation that suggests which visual elements of the image to manipulate to improve the corresponding aesthetic score, wherein the visual elements are capable of being manipulated by a computer.

18. The method of claim 1, wherein training a classifier comprises training one of a Bayesian classifier, a Support Vector Machine (SVM) classifier, a neural net classifier, and a decision tree classifier.

19. The method of claim 17, wherein training a classifier comprises utilizing feature selection to correlate at least one image feature of the images with their corresponding aesthetic scores.

20. The method of claim 17, wherein the image includes at least one of; (a) a web page; (b) a digital photograph; (c) an electronic greeting card; (d) a desktop-publishing document; (e) a word-processing document.

21. A machine-readable medium having instructions stored thereon for execution by a processor to perform a method comprising:
inputting an image;
generating an aesthetic score for the image by utilizing a classifier previously trained on a training set including a plurality of images and a corresponding plurality of aesthetic scores for the images;
outputting the image; and,
generating and outputting a recommendation as to how to improve the aesthetic score for the image.

22. The medium of claim 21, wherein generating an aesthetic score comprises generating an aesthetic score based on at least one image feature of the image.

23. The medium of claim 21, wherein utilizing a classifier comprises utilizing one of a Bayesian classifier, a Support Vector Machine (SVM) classifier, a neural net classifier, and a decision tree classifier.

24. A machine-readable medium having instructions stored thereon for execution by a processor to perform a method comprising:
inputting an image and a corresponding aesthetic score for the image previously generated by utilizing a classifier previously trained on a training set including a plurality of images and a corresponding plurality of aesthetic scores for the images;
generating a recommendation to improve the aesthetic score for the image; and,
outputting the recommendation.

25. The medium of claim 24, wherein generating a recommendation comprises utilizing a gradient ascent.

26. The medium of claim 24, wherein generating a recommendation comprises performing a local search.

27. The medium of claim 24, wherein inputting an image and a corresponding aesthetic score comprises inputting an image and a corresponding aesthetic score for the image previously generated based on at least one image feature of the image.

28. The medium of claim 24, wherein inputting an image and a corresponding aesthetic score comprises inputting an image and a corresponding aesthetic score for the image previously generated by utilizing one of a Bayesian classifier, a Support Vector Machine (SVM) classifier, a neural net classifier, and a decision tree classifier.

* * * * *